United States Patent [19]

Hasegawa et al.

[11] Patent Number: 4,674,965

[45] Date of Patent: Jun. 23, 1987

[54] CONTROL APPARATUS FOR A VULCANIZING MACHINE

[75] Inventors: Akira Hasegawa; Kaoru Nishimura, both of Akunoura; Yukio Yoshida, Nagoya, all of Japan

[73] Assignee: Mitsubishi Jukogyo Kabushiki Kaisha, Tokyo, Japan

[21] Appl. No.: 525,109

[22] Filed: Aug. 22, 1983

[30] Foreign Application Priority Data

Oct. 30, 1982 [JP] Japan ................. 57-191002

[51] Int. Cl.$^4$ ............... B29C 35/02; B29C 43/58
[52] U.S. Cl. ............................. 425/29; 425/30; 425/143; 425/160; 425/169
[58] Field of Search ............ 425/29, 30, 169, 170, 425/143, 149, 144, 160; 264/40.6, 315, 326, 236, 347; 364/185, 188, 189

[56] References Cited

U.S. PATENT DOCUMENTS

| | | | |
|---|---|---|---|
| 2,128,417 | 8/1938 | Kerr | 425/30 |
| 2,204,531 | 6/1940 | Erbguth et al. | 425/30 |
| 2,204,532 | 6/1940 | Erbguth et al. | 425/30 |
| 2,987,770 | 6/1961 | Powell | 425/30 |
| 3,443,280 | 5/1969 | Hugger | 425/29 |
| 3,566,439 | 3/1971 | Mouly et al. | 425/144 |
| 3,579,626 | 5/1971 | Brittain | 425/30 |
| 3,597,794 | 8/1971 | Mann | 425/170 |
| 3,819,915 | 6/1974 | Smith | 425/29 |
| 3,836,614 | 9/1974 | Neugroschl | 264/40.6 |
| 3,846,706 | 11/1974 | Thompson | 364/139 |
| 3,980,743 | 9/1976 | Smith | 264/236 |
| 4,022,555 | 5/1977 | Smith | 425/29 |
| 4,044,600 | 8/1977 | Clayton et al. | 425/170 |
| 4,097,565 | 6/1978 | Cole et al. | 425/30 |
| 4,222,721 | 9/1980 | Gado | 425/30 |
| 4,303,973 | 12/1981 | Williamson et al. | 364/189 |
| 4,344,142 | 8/1982 | Diehr et al. | 425/144 |
| 4,371,483 | 2/1983 | Mattson | 425/30 |
| 4,404,637 | 9/1983 | Walters et al. | 364/140 |
| 4,542,466 | 9/1985 | Arimatsu | 425/30 |

FOREIGN PATENT DOCUMENTS 55-126434 9/1980 Japan .
1293941 10/1972 United Kingdom .

Primary Examiner—Willard E. Hoag
Attorney, Agent, or Firm—Birch, Stewart, Kolasch & Birch

[57] ABSTRACT

A control apparatus for a vulcanizing machine in which vulcanizing is effected by introducing a vulcanizing medium into a rubber made product placed in a molding die and then discharging the same therefrom is disclosed, wherein said control apparatus includes a vulcanizing sequence timer adapted to an output a function signal in response to a vulcanizing operation start signal on the basis of vulcanizing data comprising preset vulcanizing steps and functions, said vulcanizing data being read by said vulcanizing sequence timer, and a plurality of control valves for controlling introduction and discharge of a vulcanizing medium in accordance with said function signal outputted from the vulcanizing sequence timer whereby sequential function of the vulcanizing machine is automatically carried out.

9 Claims, 12 Drawing Figures

FIG. 2 (PRIOR ART)

| STEP | | FUNCTION | | | | | | |
|---|---|---|---|---|---|---|---|---|
| NO. | TIME | 1 HIGHER PRESSURE STEAM | 2 LOWER PRESSURE STEAM | 3 HOT WATER | 4 COOLING WATER | 5 RELEASING OF INNER PRESSURE | 6 RECOVERY OF HOT WATER | 7 OTHERS |
| 1 | 0.5 (MIN.) | ○ | | | | | | |
| 2 | 10 | | | ○ | | | | |
| 3 | 1 | | | | ○ | | | |
| 4 | 0.5 | | ○ | | | | | |
| 5 | 0.5 | | | | | ○ | | |
| 6 | COMPLETION OF VULCANIZATION | | | | | | ○ | ○ |

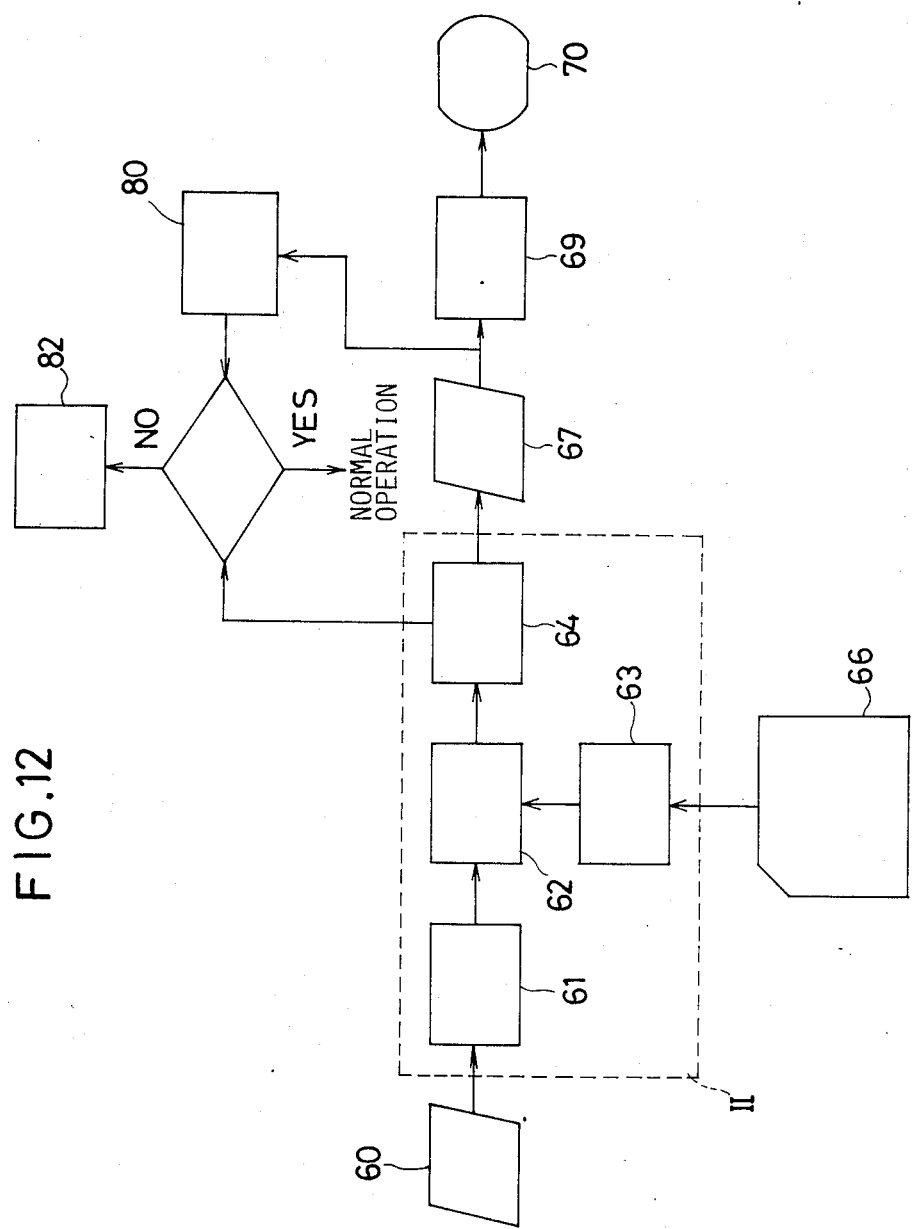

CONTROL APPARATUS FOR A VULCANIZING MACHINE

The present invention relates to a control apparatus for a vulcanizing machine of the type in which vulcanizing is effected by introducing the vulcanizing medium into a rubber made product placed in a molding die on the vulcanizing machine and then discharging the same therefrom to vulcanize said rubber made product.

To facilitate understanding of the invention a hitherto known control apparatus will be briefly described below with reference to FIGS. 1 to 3.

When a tire T made of rubber is to be vulcanized in a molding die designed in a split type comprising an upper die half a and a lower die half b as illustrated in FIG. 1. (the illustrated molding die is typical and it should not be limited only to the split type), it is heated from the inside under the influence of pressure by way of a bladder C made of rubber by introducing vulcanizing medium such as hot water, steam or the like fluid via pipings f and g, whereas it is heated up from the outside by way of both the upper and lower die halves a and b by introducing steam into the cavity of both the upper and lower hot plates d and e.

To vulcanize a tire for a motorcar, the tire is heated up from both the inside and outside of the vulcanizing machine in the above-described manner but there is a necessity for a presetting a new vulcanizing operation prolonging time, platen temperature and others each time a tire specification changes. In practice, about 200 kinds of tire specifications are available with respect to passenger car tires. Now a typical vulcanizing operation will be described with reference to FIG. 2 which is a step table. In the step 1 high pressure steam is introduced into the molding die as vulcanizing medium for 0.5 minutes. In step 2 hot water is introduced for 10 minutes. Next, in step 3 cooling water is introduced for one minute. Thus, to complete the vulcanizing operation a plurality of functions are practiced until the step 6 in accordance with the predetermined sequence as illustrated in the step table.

To carry out function control for the vulcanizing machine as constructed in the above-described manner a mechanical cam mechanism as illustrated in FIG. 3 is employed which essentially includes a function drum 01, a function cam 02, a gap gauge 03, an adjusting screw 04 and an electrically or pneumatically operated switch 05. When function control is to be changed, the function cam 02 and the adjusting screw 04 are rearranged in accordance with a specific tire specification by manually operating them on the spacially limited control panel.

However, drawbacks have been found inherent to the conventional function control mechanism in that the whole vulcanizing machine is controlled with great difficulties and thereby uniform quality of tires is difficult to achieve. Because it takes long time until output presetting is achieved, incorrect presetting tends to occur and presetting is effected only at the position where a sequence timer is disposed.

The conventional tire vulcanizing machine is operated with a temperature of vulcanizing medium in a tire, selection of introduction and discharge of vulcanizing medium (hot water, steam or the like) and step time being present on the vulcanizing sequence timer. When it is necessary to keep the vulcanizing machine opened for a long period of time at the start-up time of the vulcanizing operation or for a certain reason, there is the fear that the molding die temperature decreases would decrease and vulcanizing would thus be insufficiently effected within a period of time preset by the vulcanizing sequence timer. In this case vulcanizing time is prolonged by means of another timer adapted to be actuated by an operator. However, since this is achieved by manual operation, presetting tends to be carried out inexactly and thereby a correct response to the necessary vulcanizing time is not assured reliably. Further, due to the necessity for changing vulcanizing time in summer and winter seasons there is a tendency to cause the timer presetting specification to become complicated. To resolve the foregoing problems it was already proposed to constuct a tire vulcanizing machine of the prior art as disclosed, for instance, in British Pat. No. 1293941 in such a manner as to detect the temperature of the tire itself and carry out a calculation to determine vulcanizing time. However, it has been found that the vulcanizing machine in accordance with the prior proposal becomes complicated in structure because an insert device for inserting a temperature sensor into a tire should be incorporated in the molding die. The sensor has reduced durability. The optimum position is difficult to preset. For many reasons as mentioned above the proposed tire vulcanizing machine fails to be practical.

As tire size changes, the steps and functions as typically illustrated in FIG. 2 are subjected to preset changing on the vulcanizing sequence timer and molding die heating temperature is then changed by an operator correspondingly. However, there is the fear of causing incorrect presetting or forgetting of a changing operation and a problem is that deteriorated quality of finished tires due to such malfunction as mentioned above is difficult to detect visually and it is known only after they are delivered to a commercial market. Thus, a large number of tires produced are ultimately rejected.

A vulcanizing medium is introduced into a tire and discharged therefrom in accordance with the specified vulcanizing step and visual monitoring is carried out by an operator by detecting the correct introduction of vulcanizing medium with the aid of a detector and recording the results of detection on a recording instrument.

As a number of machines are operated by a single operator due to the recent wide popularization of automatic operation, there is a tendency to check many recording instruments insufficiently and therefore malfunctions are found out with much delay. In an extreme case the results of recording kept in a factory are reexamined and thereby a malfunction is found only after defective tires are found by consumers.

To prevent such malfunction as mentioned above there were already made a few proposals. One of them is that the content of recodings be automatically monitored in an optical manner as disclosed in Japanese Laid-Open Pat. No. 126434/80, while another one is that temperature of a tire itself be detected to determine the working conditions of a vulcanizing operation, as disclosed in English Pat. No. 1293941. However, drawbacks have been found with respect to the prior proposals in that an apparatus is a complicated structure and manufactured at a high cost with reduced reliability.

The present invention has been made with the foregoing problems in mind and its object resides in providing a new and useful control apparatus for a vulcanizing machine which assures that timer presetting is easily carried out without any fear of improper handling within a reduced period of time required for presetting, preset changing is easily carried out with improved maneuverability accompanied and the display function is improved by displaying input, output, vulcanizing specification, vulcanizing operation prolonging time, total residual working time, total working time and others so that improved quality of tires is guaranteed.

Further, it is another object of the present invention to provide a control apparatus for a vulcanizing machine which assures that tires are vulcanized under constant working conditions at all times with an improved quality of tires.

It is another object of the present invention to provide a control apparatus for a vulcanizing machine which assures that the presetting and controlling of molding die heating temperature are automatically carried out without a malfunction such as incorrect presetting or the like.

It is further another object of the present invention to provide a control apparatus for a vulcanizing machine which assures that incorrect vulcanization is predictively detected with high reliability to issue an alarm signal.

it is still another object of the present invention to provide a control apparatus for a vulcanizing machine which assures that incorrect vulcanization is predictively detected with high reliability to issue an alarm signal and which has excellent features with respect to economy and maintenance.

Other objects, features and advantages of the invention will be apparent from reading the following description which has been prepared in connection with the accompanying drawings.

It should be understood that the following description and the accompanying drawings are merely illustrative of preferred embodiments of the invention but the latter should not be limited only to them and many changes or modifications may be made in a suitable manner without any departure from the spirit and scope of the invention as defined in appended claims.

The accompanying drawings will be briefly described below.

FIG. 2 is an example of a step diagram for the tire vulcanizing machine, particularly illustrating tire vulcanizing steps and function data.

FIG. 12 is a block diagram illustrating a control system in a control apparatus in accordance with still another embodiment of the present invention, said control system being provided with a monitoring mechanism.

Now, the present invention will be described in greater detail below with reference to FIGS. 4 to 12 which illustrate preferred embodiments of the invention.

First, description will be made as to a control apparatus for a vulcanizing machine in accordance with the first embodiment of the invention with reference to FIGS. 4 to 7.

Figure 4:
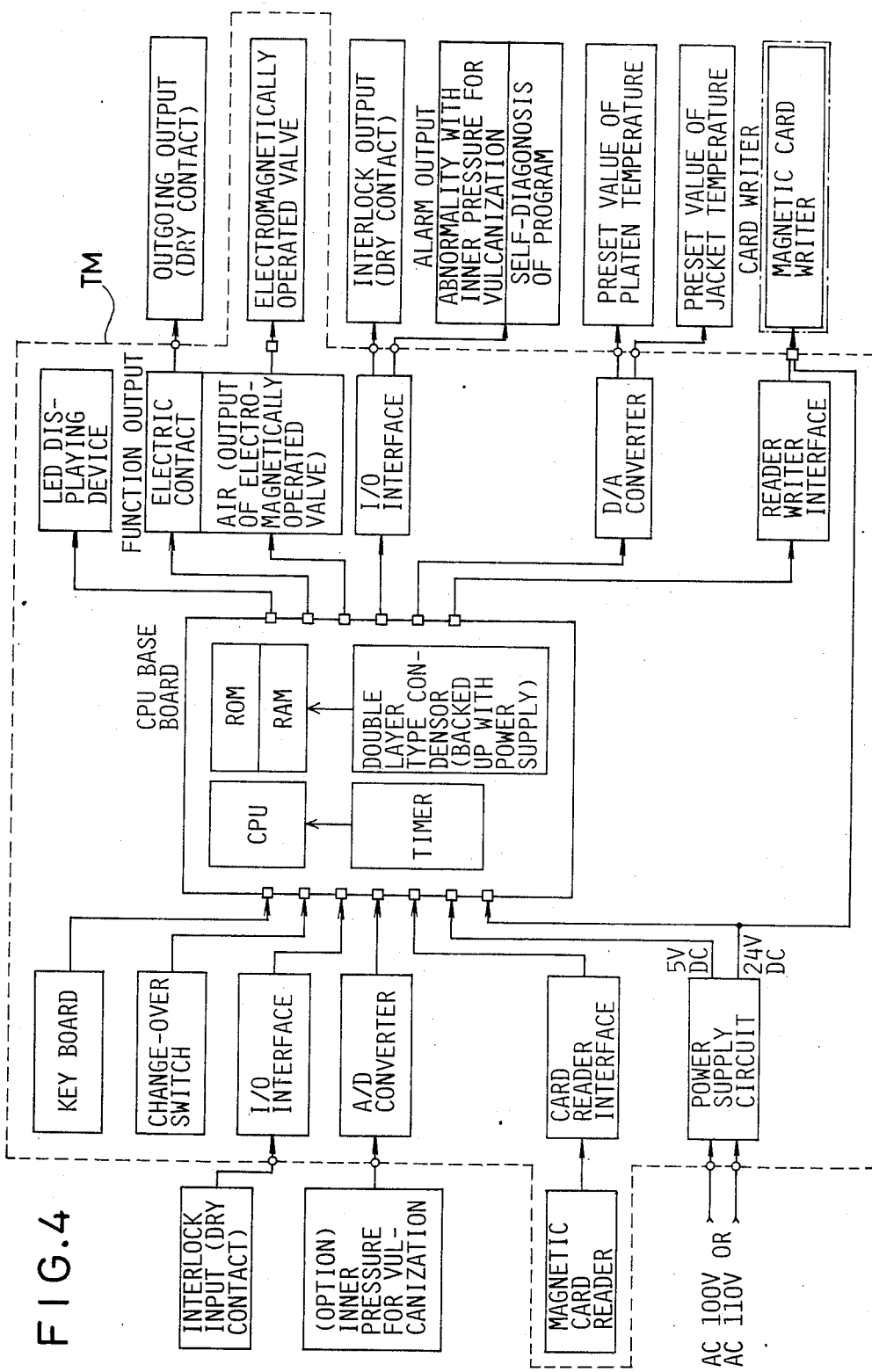
FIG. 4 is a block diagram illustrating a control system in a control apparatus in accordance with an embodiment of the present invention.
Figure 5:
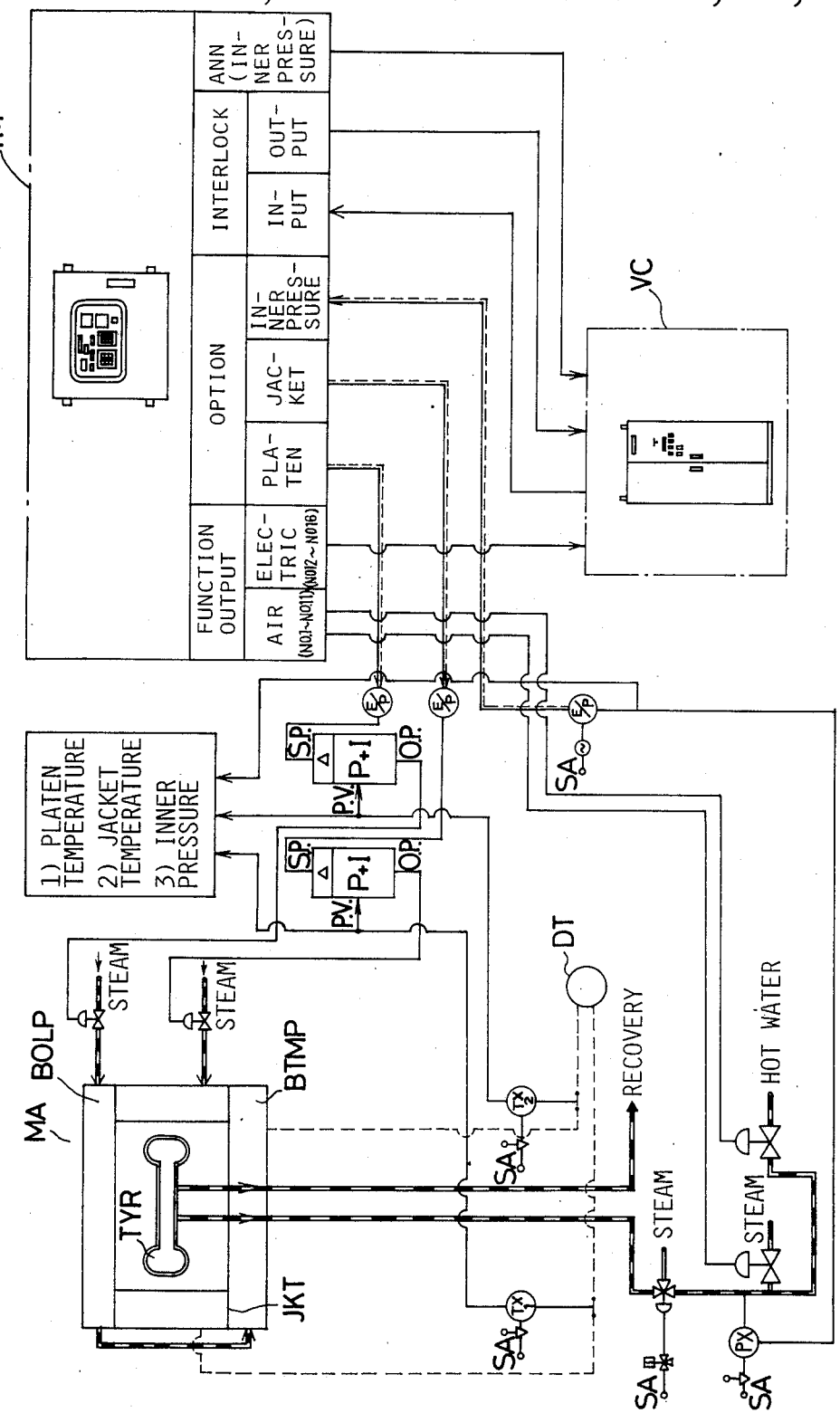
FIG. 5 is a control circuit diagram for the control system in FIG. 4.

In FIGS. 4 and 5 reference letter TM designates a vulcanizing sequence timer unit, reference letter MA a mold assembly comprising a bolster platen BOLP, a bottom platen BTMP and a jacket JKT, reference letter TYR a tire to be vulcanized, reference letter VC a control board for the vulcanizing machine, reference letter PW a pen type recorder and reference letter DT does a drain tank. It should be noted that the vulcanizing sequence timer unit TM is constructed in a manner well known by any expert in the art and therefore its description will not be required.

Figure 6:
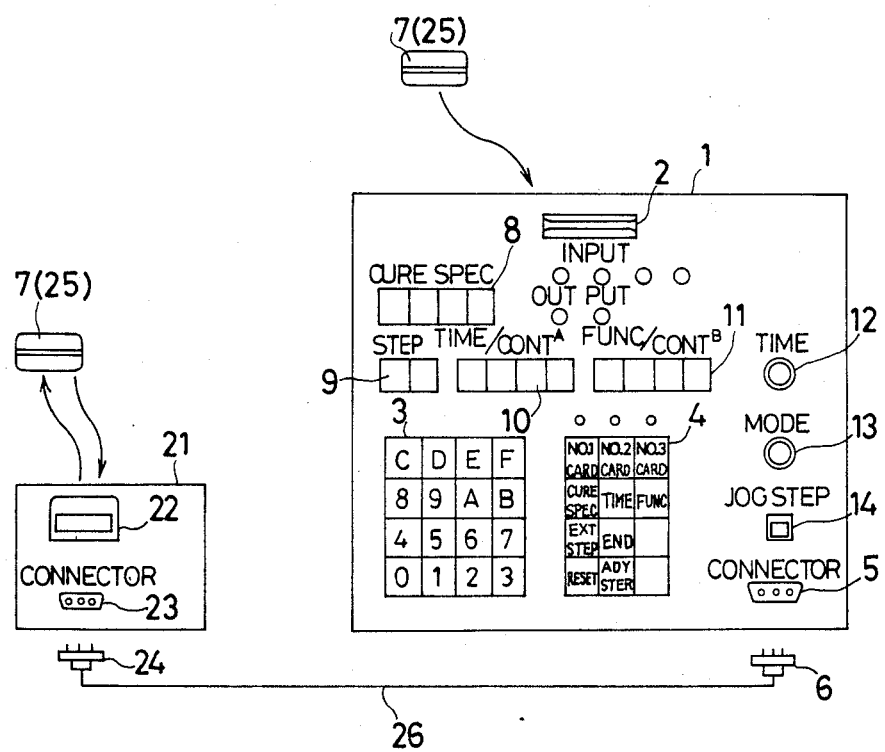
FIG. 6 is a front view of a vulcanizing sequence timer unit in FIGS. 4 and 5.

Next, referring to FIG. 6, the control apparatus of the invention includes a vulcanizing sequence timer unit 1 and a card reader writer 21. Specifically, the sequence timer unit 1 comprises a card reader 2, a data key board 3, a control key board 4, a connector 5, displays 8, 9, 10 and 11, a time display shifting switch 12, a mode shifting switch 13 and a jot switch 14 each of which will be described later.

The card reader 2 is constructed so as to read data on a magnetic card in which vulcanizing sequence control data such as time, function or the like are stored and thereafter keep them in memory in the sequence timer unit 1.

The data key board 3 serves to input data such as vulcanizing time, function, step number or the like.

The control key board 4 includes a card discriminating switch employed when a plurality of magnetic cards are in use, a key for indicating what data have been preset by the data key board 3, switches required for operating the control apparatus and others.

To assure that signals are transmitted from the vulcanizing sequence timer unit 1 to the card reader writer 21 and vise versa both the vulcanizing sequence timer unit 1 and the card reader writer 21 are disconnectably connected to one another via a connector 5, a connector 6, a cable 26, a connector 24 and a connector 23.

As will be described later, the displaying devices 8, 9, 10 and 11 are adapted to display a number of preset values such as vulcanizing specification number, step number, step time, function number, inner pressure condition, platen temperature, platen condition and others.

The time display shifting switch 12 is operated to selectively display step time, total vulcanizing time, residual vulcanizing time, vulcanization prolonging time or the like on the displaying device 10 on the basis of the aforesaid preset values and the results of processing carried out with the aid of a microcomputer incorporated in the sequence timer unit 1.

The mode sfifting switch 13 serves to carry out shifting to automatic operation, manual operation or the like on the sequence timer unit 1.

The jog switch 14 serves to carry out manual step feed in each of the steps.

Further, the card reader writer 21 includes a card insert device 22, a connector 23 and a data processing device incorporated therein.

Prior to initiating introduction or discharge of heating medium such as hot water, steam or the like at higher temperature and pressure into or from a tire mounted on the tire vulcanizing machine with the aid of the control apparatus of the invention as constructed in the above-described manner, it is necessary to prdetermine working time in each of the steps and moreover a temperature of steam in the hot plate which serves to heat a molding die or a temperature of steam in a jacket when the latter is incorporated in the molding die.

Next, the aforesaid data are stored in a RAM memory incorporated in the sequence timer unit 1 by operating the data key board 3 and the control key board 4 while they are confirmed on the display devices 8 to 11.

Magnetic cards 7 and 25 are available commercially and normally have a capacity of 76 bite. Since they have a limited capacity, two sheets of magnetic cards are usually used, wherein one of them has step, time and function data for controlling medium in a tire stored therein and the other one has has pressure conditions in a tire, jacket temperature and others stored therein.

Now, one example of making presettings will be described below. First, a switch "NO. 1 CARD" on the control board 4 is manually depressed so that symbols and numbers in four figures are inputted by operating the data key board 3 so as to specify vulcanizing conditions. Next, a switch "CURE SPEC" is manually depressed on the control key board 4. Thus, the symbols and number are displayed on the column "CURE SPEC" of the displaying device 8 and at the same time they are stored in the RAM memory incorporated in the sequence timer unit 1.

Next, a key "ADV STEP" on the control key board 4 is depressed so that "STEP 1" is displayed on "STEP" on the display device 9. Next, step time is selectively keyed on the data key board 3 and thereafter a switch "TIME" on the control key board 4 is depressed so that the selected time is stored in the RAM memory as a preset time for the STEP 1 and it is displayed on "TIME CONT A" of the displaying device 10.

Next, each of the functions in the STEP 1 is inputted by the data key board 3 to specify them and thereafter a switch "FUNC" on the control key board 4 is depressed. Thus, "FUNC CONT B" is displayed on the displaying device 11 and it is stored in the RAM memory in the same manner as in the foregoing.

Further, when a switch "ADV STEP" on the control key board is depressed, "STEP 2" is displayed and thereafter the above-mentioned operations are repeated.

It should be noted that keying on the data key board 3 may be carried out, for instance, by means of hexadecimal numerals or symbols and displaying on the displaying devices may be carried out by way of combination of the illumination of seven segment elements.

With respect to the NO. 2 card a switch "NO. 2 CARD" on the control key board 4 is depressed and preset values of inner pressure conditions, jacket temperature and others are stored in the RAM memory with the aid of a combination of both the key boards 3 and 4.

After checking of the content of the above-mentioned data is completed, the sequence timer unit 1 is connected with the card reader writer 21 via the connectors 5, 6, 23 and 24 and the cable 26 and the magnetic card 7 is inserted into a card insert device 22 whereby the aforesaid data stored in the RAM memory on the sequence timer unit 1 are in turn stored in the magnetic card 7.

This magnetic card 7 is stored as a master card and another magnetic card 7 is inserted into a reader 2 on the sequence timer unit 1 for the practical vulcanizing operation so that the data are inputted into the RAM memory. When the operational card 25 is inserted into the card insert device 22, the aforesaid data are stored on the magnetic card 25 whereby a required number of copies are ready to be available.

When practical operation is to be initiated, the magnetic card 25 is inserted into the card reader 2 so that the data are stored in the RAM memory. Thereafter, a series of vulcanizing cycles are carried out sequentially with the aid of the RAM memory. To assure that the RAM memory is kept active a back-up battery is usually put in use.

Where there are available many data depending on the kind of vulcanizing specification to be employed it is required that plural pairs of magnetic cards 7 and 25 be provided. To prevent incorrect operation a vulcanizing specification number is usually stored in each of the magnetic cards. If magnetic cards have a stored number different thereamong, an arrangement is made such that error display is effected. Further, when data other than predetermined data corresponding to the card number as specified by the key board 4 are to be inputted, an arrangement is made such that error display is effected in the same manner.

Now, description will be made as to the time display shifting switch 12. As described above, each of predetermined step times is processed by means of a processing function and timing function of the microcomputer incorporated in the sequence timer unit 1 and it is possible to extract the total time through the whole steps, elapsed time in the course of vulcanization, residual working time in the latter, elapsed time in each of the steps, residual working time in the latter and others in the form of an outgoing output in depending on how the soft wear in the microcomputer is designed. In the illustrated embodiment an arrangement is made such that necessary data can be read from the displaying device 10 by operating the shifting switch 12.

Further, in view of the fact that temperature in the molding die decreases due to heat radiation therefrom while it is kept open, provided that a tire is loaded on and it is later unloaded from the vulcanizing machine with the necessity of a long time therefor, it will be required to prolong vulcanizing time. To meet the requirement the control apparatus is designed such that time to be prolonged and step to be prolonged can be preset with the aid of the aforesaid key board or the magnetic card and moreover the preset time can be read by operating the aforesaid shifting switch.

Since the control apparatus is constructed in the above-described manner, the following advantageous features are obtainable. Specifically, employment of the magnetic card input type microcomputer makes it possible to very easily preset necessary data to be preset in accordance with each of vulcanized tire specifications relative to the vulcanizing machine without error and moreover to make a variety of data presettings which may be impossible with any hitherto known mechanical type sequence timer. In addition to the above-mentioned data examples molding pressurre, die opening and closing stroke and others can be preset with the aid of the magnetic cards employed for the sequence time while specific detectors are additionally disposed.

Further, as described above, the number of magnetic cards can increase in response to an increased amount of data whereby incorrect presetting can be completely prevented by allowing a plurality of magnetic cards to have a discriminating capability.

Moreover, it is possible to provide another data preparation device having the same functions as those of the key board on the sequence timer unit 1 for the purpose of preparing a master card 7. It is also possible to allow data stored in the main computer to be stored on a magnetic card 25.

Further, it is possible to employ punched card or the like means having the same function instead of a magnetic card.

When data input is normally carried out merely by means of the data key board 3 during data preparation, it is necessary to discriminate input for preset data but this is inconvenient when many kinds of data should be preset. On the other hand, since the control apparatus of the present invention makes it possible to carry out discriminating display by one-touch operation with the control key board 4, operation is easy with a reduced amount of incorrect operation.

Next, description will be made as to the control of vulcanizing time where temperature decreases due to heat radiation from a molding die while the latter is kept open for a long period of time.

Figure 1:
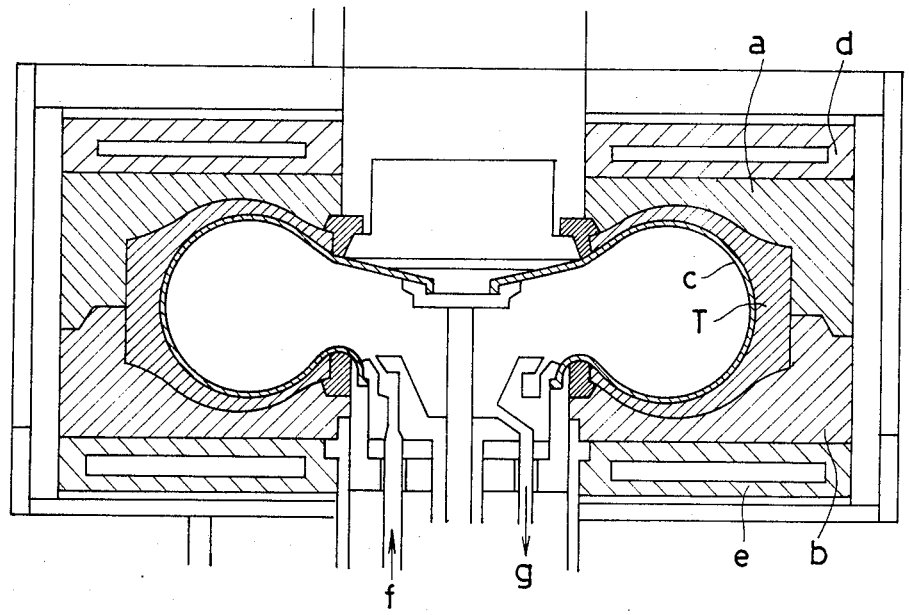
FIG. 1 is a vertical sectional view of an essential part of a tire vulcanizing machine illustrating how vulcanizing is effected for a tire in a molding die.
Figure 3:
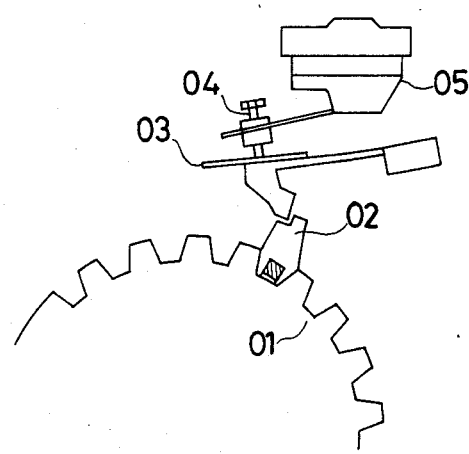
FIG. 3 is a fragmental side view of the conventional cam type timer for the control apparatus, shown in an enlarged scale.

As already described above with reference to FIG. 1, vulcanization is carried out by way of the steps of loading a tire T to be vulcanized between both the upper and lower die halves a and b, fitting a bladder C into the tire T with both the upper and lower clamps disposed outside the latter so as to hold said bladder C in position, introducing vulcanizing medium (hot water, steam or the like) into the bladder C by way of pipings e and f to heat the tire T from the inside while the bladder C comes in contact with the inner surface of the tire T and the latter in turn comes in contact with the inner wall of both the upper and lower die havles a and b, and at the same time introducing steam into the interior of both the upper and lower hot plates d and e to heat the tire T from the outside by heating both the upper and lower die halves a and b.

Figure 7:
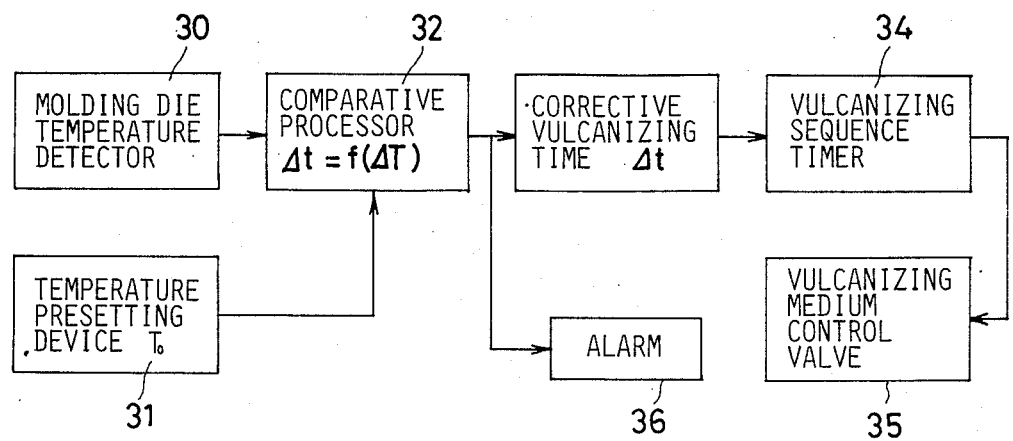
FIG. 7 is a block diagram illustrating a control system in a control apparatus in accordance with another embodiment of the present invention, said control system being adapted to control the vulcanizing time.

To assure that vulcanizing time is properly controlled there is provided a control system as schematically illustrated in FIG. 7. In the drawing which shows a flow chart for the control system reference numeral 30 designates a molding die temperature detector which serves to measure the current temperature in the molding die, reference numeral 31 a temperature presetting device for presetting temperature in the molding die which is operated under the normal condition, reference numeral 32 a comparative processor for calculating a corrected vulcanizing time $\Delta t$ according to the function $\Delta t = f(\Delta T)$ after obtaining a differential temperature $\Delta T$ between the existing temperature and the preset temperature $T_o$, reference numeral 36 an alarm for informing to an operator that the corrected vulcanizing time $\Delta t$ has been calculated (in the event of abnormality) and reference numeral 34 a vulcanizing sequence timer (valve controller). It should be noted that the vulcanizing sequence timer 34 comprises a timer in which a preset vulcanizing time (vulcanizing time under the normal operating condition) is stored and it is adapted to function so as to actuate a vulcanizing medium control valve 35 in response to a corrected vulcanizing time which has been corrected with the corrective vulcanizing time $\Delta t$ received therein after generation of the latter.

A temperature on the outer surface of the molding die is detected by means of the molding die temperature detector 30. Further, a preset temperature $T_o$ at a time when the molding die starts a vulcanizing operation and a function $f(\Delta T)$ for a relation of the corrected vulcanizing time $\Delta t$ to a differential temperature $\Delta T$ when the existing temperature is lower than the preset temperature $T_o$ are preset by the comparative processor 32 with the aid of a temperature presetting device 31. When the existing temperature in the molding die detected by the molding die temperature detector 30 is lower than the preset temperature $T_o$ at a time of starting the vulcanizing operation, required vulcanization is carried out by way of the steps of calculating vulcanizing time to be prolonged by means of the comparative processor 32, feeding it to the vulcanizing sequence timer 34 to correct the preset time and thereafter controlling the vulcanizing medium control valve 35 according to signals from the vulcanizing sequence timer 34 so that vulcanizing medium is introduced into or discharged from the tire or steam is introduced into or discharged from both the upper and lower hot plates d and e.

A tire vulcanizing machine is normally operated without interruption under the predetermined working conditions and therefore operations are repeated by way of the steps as preset by the vulcanizing sequence time. When the tire vulcanizing machine should be kept open at a time of starting-up or for a certain reason, an operator causes another vulcanizing sequence time to be operated so as to prolong vulcanizing time. Further, since vulcanizing time varies in summer and winter, it is necessary to change preset specifications for the vulcanizing sequence timer. Any deviation from the above-described successive operating conditions is mostly attributable to the fact that temperature in the molding die is lower than the predetermined one. Owing to the arrangement of the control apparatus of the invention that a vulcanizing time prolong command is issued in response to temperature difference when temperature in the molding die is lower than the preset one, it is assured that any incorrect operation conducted by an operator can be completely prevented and moreover vulcanizing is effected under the constant working conditions at all times, resulting in an improved quality of vulcanized tires.

It should be noted that the position where temperature in the molding die is preferably located in the proximity of the parting line between both the upper and lower die halves in which temperature tends to decrease to the lowermost level. Generally, the outer surface of the molding die is lined with thermal insulating material and therefore the temperature on the outer surface of the thermal insulating material is naturally related to temperature in the molding die. For this reason the temperature in the molding die may be detected on the outer surface of the thermal insulating material with certain unavoidable fluctuation accompanied. Alternatively, the temperature in the air layer between the thermal insulating material and the molding die may be detected. Further, an arrangement may be made such that an alarming signal is issued from the alarm 36 when the temperature difference is in excess of the predetermined allowable extent.

Figure 8:
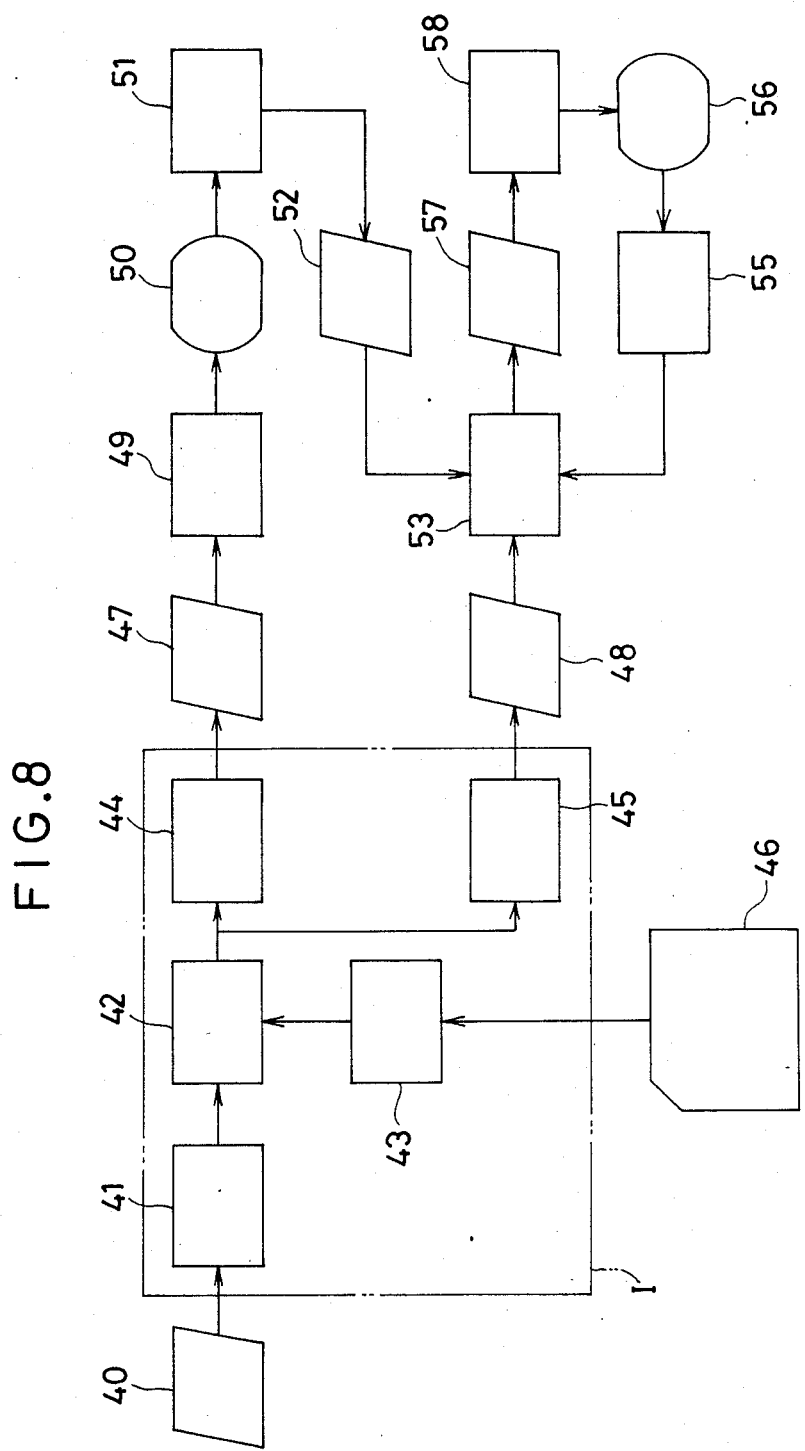
FIG. 8 is a block diagram illustrating a control system in a control apparatus in accordance with another embodiment of the present invention, said control system being adapted to control molding die temperature.

Next, description will be made as to a preferred embodiment of the molding die temperature control system with reference to FIG. 8.

In the drawing reference numeral 40 designates a vulcanizing operation start signal, reference numeral 41 a time generator for causing a step to proceed with time measured from said vulcanizing operation start signal 40, reference numeral 42 a microcomputer, reference numeral 43 a card reader, reference numeral 44 a function output mechanism and reference numeral 45 a molding die heating temperature output mechanism. A vulcanizing sequence timer I is constituted by a combination of the aforesaid components 40 to 45. Further, reference numeral 46 designates a magnetic card on which required data comprising tire specification number, step time, function and molding die heating temperature are stored. An arrangement is made such that the data stored on said magnetic card 46 are outputted as a function signal 47 and a molding die heating temperature presetting signal 48 by way of the steps of reading them with the aid of the card reader 43, processing them in the microcomputer 42 and then converting its output into outgoing driving signals by means of the function output mechanism 44 and the molding die heating temperature output mechanism 45. Further, to assure that temperature on the hot plate (i.e., molding die heating temperature) is kept to a predetermined level an arrangement is made such that a group of control valves 49 are opened and closed successively so as to allow vulcanizing medium 50 to be introduced into a tire according to each of the vulcanizing steps as illustrated, for instance, in FIG. 2. As signals 47 are received from the function output mechanism 44, the temperature and pressure of the vulcanizing medium 50 are detected by means of a detector 51, signals from the latter are recorded on a recording and adjusting instrument 53, molding die heating temperature presetting signals 48 are inputted into said recording and adjusting instrument 53 from the molding die heating temperature output mechanism 45, preset values of the recording and adjusting instrument 53 and temperature in the hot plate adapted to be heated by molding die heating medium 56 are feedback controlled by adjusting the function of the recording and adjusting instrument 53, said temperature being detected by means of a detector 55 and opening of a steam flow rate control valve 58 is automatically controlled by output signals 57 (molding die heating and adjusting signals) from the preceding step so as to control the flow rate of steam to be delivered to the hot plate.

When the tire size is changed for any reason, a magnetic card 46 with tire specification number, step time, function and molding die heating temperature inputted therein corresponding to the aforesaid tire size is inserted into the card reader 43 of the sequence timer I so that the relevant data are stored in the microcomputer 42.

When a vulcanizing operation start command signal 40 is issued from the tire vulcanizing machine, the time generator 42 on the sequence timer I initiates time measurement and then a function signal 47 is generated for each of the steps by processing the data stored in the microcomputer 42 so that vulcanizing medium is introduced into and discharged from a tire successively as the group of control valves 49 are opened and closed while temperature and pressure of the vulcanizing medium are recorded on the recording instrument 53. On the other hand, the molding die heating temperature is kept to a predetermined height with the aid of the recording and adjusting instrument 53, the temperature detector 55 and the flow rate control valve 58 in response to a preset value signal 48 issued from the sequence timer I whereby the temperature of vulcanizing medium is recorded.

As described above, the molding die heating temperature is preset and controlled corresponding to the tire specification while a pair of vulcanizing medium step and function are preset. Owing to this there is no incorrect presetting and moreover presetting and controlling are simply achieved without any need for substantially changing or modifying the heretofore used apparatus.

It should be noted that molding die temperature control should not be limited only to the above-described embodiment and it may be carried out in the following manners each of which should be considered within the scope of the invention.

(1) The card 43 for the sequence timer I is usually designed in the form of a magnetic card or a punch card. Besides them, EPROM and centralized data transmission system with a main comp connected thereto may be employed for it. In any case the purpose of the invention can be achieved by data processing a combination of tire specification, step, function and molding die heating temperature. When a card has a small capacity, it is divided into two parts, one of them being a step and function presetting card while the other one being a molding temperature presetting card with tire specification number inputted into each of them. Thus, the purpose of the present invention can be fulfilled by causing the sequence timer to have a checking function corresponding to tire specification number.

(2) Some of heretofore used recording and adjusting instruments fail to directly receive temperature presetting signals 48 depending on their type. This problem can be resolved by incorporating a converter such as an electric-pneumatic converter or the like therein.

(3) It is possible to utilize the function of the adjusting instrument 53 depending on capacity of the microcomputer incorporated in the sequence timer I.

In the above-described embodiment the recording and adjusting instrument 53 has both functions of recording and adjusting. Alternatively, it may be designed in a separate type.

(4) When a detected value is deviated from an actually measured value during controlling of molding die heating temperature, alarming may be automatically effected.

(5) The control apparatus of the invention should not be limited only to tires but it may be applicable to vulcanization of other rubber made products.

(6) Two cards may be prepared, one of them being for the purpose of presetting the function and the other one being for the purpose of presetting the molding die temperature, while data for recognizing correspondence therebetween are preset for them. This makes it possible to use multi-purpose cards having a small capacity with the prevention of incorrect card selection assured.

Next, description will be made as to another embodiment of the invention with reference to FIG. 9, wherein the control apparatus is provided with an automatic operation monitoring device.

In the drawing reference numeral III designates a microcomputer type vulcanizing sequence timer which includes a time generator 61, a card reader 63 for reading the content of a card 66 by which order of steps in accordance with tire specification, step time and function (in accordance with vulcanizing medium selection signal command) are preset, a microcomputer 62 for processing their data and a function output mechanism 64 for outputting function signals 67 and 68 corresponding to card presetting for each of the steps so that said vulcanizing sequence timer is operated according to vulcanizing operation start signals 60.

The function signals 67 are prepared mostly in the form of a pneumatic signal so that a group of control valves 69 are opened and closed for the purpose of introducing vulcanizing medium into a tire and discharging it therefrom for each of the steps as illustrated in FIG. 2.

On the other hand, the microcomputer 62 has a presetting device 73 incorporated therein, said presetting device 73 being adapted to preset temperature and pressure conditions for vulcanizing medium to be introduced and discharged and thereby automatically select temperature and pressure preset values (comprising reference value and allowable deviated value) of the relevant vulcanizing medium in accordance with function signals 68.

Further, a detector 71 for detecting the temperature or pressure of the vulcanizing medium is disposed in a tire or at the position located midway of a piping extending thereto so that detected value 72 of the detector 71 and preset value 74 of the presetting device 73 are compared with one another with the aid of a comparator 75 incorporated in the microcomputer 62. If it is found that the former is deviated from the latter, alarming output 76 is generated and thereby the alarm such as a buzzer or the like means is actuated so as to automatically inhibit proceeding to the next cycle.

As a vulcanizing operation start signal 60 is inputted, the time generator 61 in the sequence timer III initiates time measurement and function signals 67 outputted for the purpose of introducing vulcanizing medium via the microcomputer 62 for each of the steps as preset by the card 66 so as to allow the group of control valves 69 to be opened and closed successively whereby vulcanizing medium 70 is introduced into a tire to be vulcanized in accordance with the steps as preset by the card. On the other hand, among the temperature and pressure conditions of the vulcanizing medium preset by the presetting device 73, preset values of vulcanizing medium introduced into tire according to the specified step are automatically selected and they are then outputted to the comparator 75. At the same time the vulcanizing medium temperature and pressure signals 72 in a tire or a piping extending thereto are inputted into the comparator 75 as they are detected by means of the vulcanizing medium detector 71. If a measured value is in excess of the extent of preset allowable deviated value, an alarming signal 76 is automatically outputted by means of the comparator 75.

Usually, several dozens of tire vulcanizing machines are installed in a single factory so that they are operated simultaneously. To operate them vulcanizing medium is delivered by way of a main piping under the predetermined common working conditions irrespective of tire size. Thus, by utilizing functions of the microcomputer in the sequence timer it is assured that the working state of vulcanizing medium in a tire is easily monitored and previous detection of a failed tire is reliably carried out, resulting in improved reliability of operation. Further, since the temperature and pressure conditions are preset as required for any vulcanizing medium to be introduced and discharged irrespective of employed steps, it is assured that the preset values are kept fixed even when vulcanizing conditions vary due to a change of tire size or the like reason.

Figure 9:
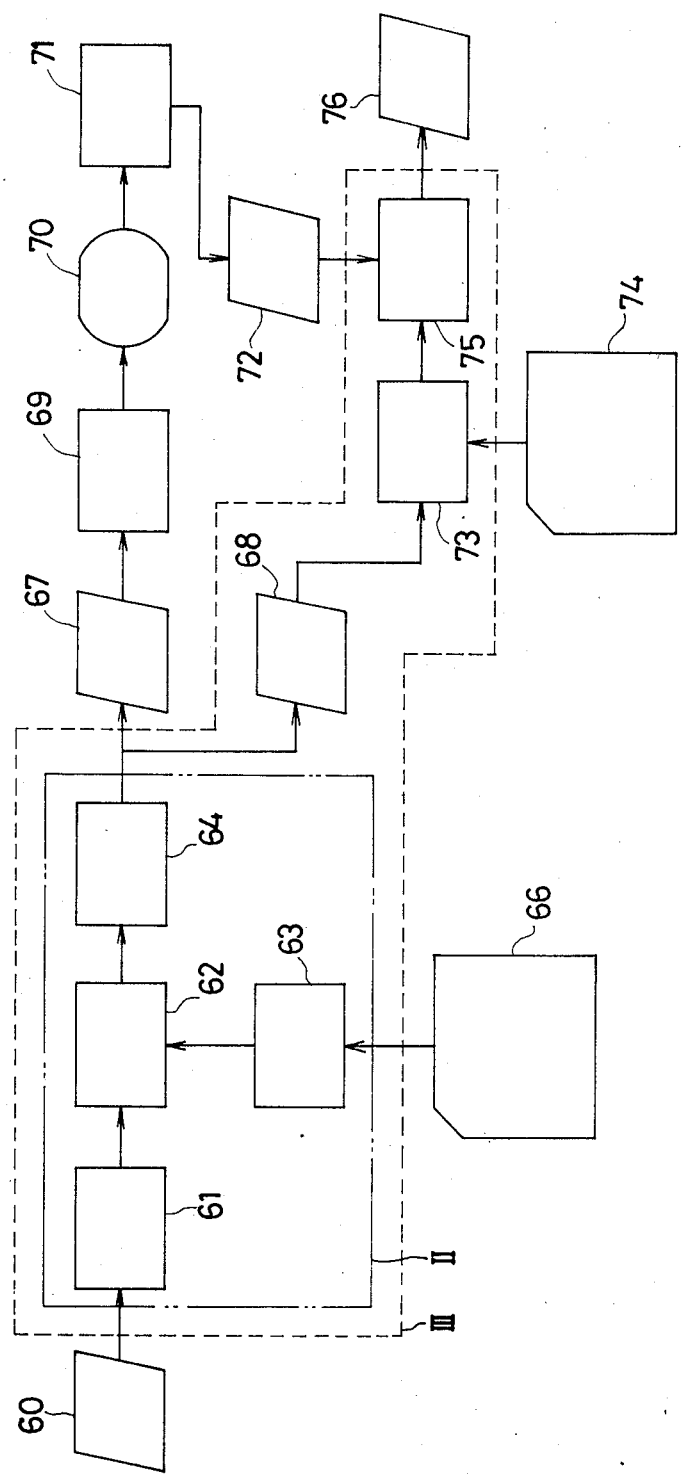
FIG. 9 is a block diagram illustrating a control system in a control apparatus in accordance with a further embodiment of the present invention, said control system being provided with a vulcanizing operation monitoring device.

It should be noted that the invention may be embodied in such a manner that the function signals prepared in the sequence timer II as illustrated by two dot-chain lines in FIG. 9 are extracted directly or by means of an electric-pneumatic converter or the like device with a presetting device 73 and a comparator 75 additionally arranged.

In the above-described embodiment step time, the function and temperature and pressure of the vulcanizing medium are preset by means of a card but the invention should not be limited onlt to this. Alternatively, the invention may be embodied by way of a key operation, counter operation, centralized data transmitting system with a main computer connected thereto or the like each of which should be considered within the scope of the invention.

Further, due to limited capacity of a universal type card the latter may be divided into two parts, one of them being for the purpose of presetting step time and function and the other one being for the purpose of presetting the temperature and pressure of vulcanizing medium, so that an occurance of incorrect presetting is prevented by means of recognition data such as vulcanizing specification number or the like.

With respect to the arrangement of various kinds of converters which may be required to equalize level of each of the inputs and outputs and occurance of deviation of temperature and pressure of vulcanizing medium from their preset values during the beginning time or due to occurance of momentary peak value they are usually neglected as long as no practical trouble takes place. Since a method of controlling them is well known by any expert in the art, its detailed description will not be required.

Figure 10:
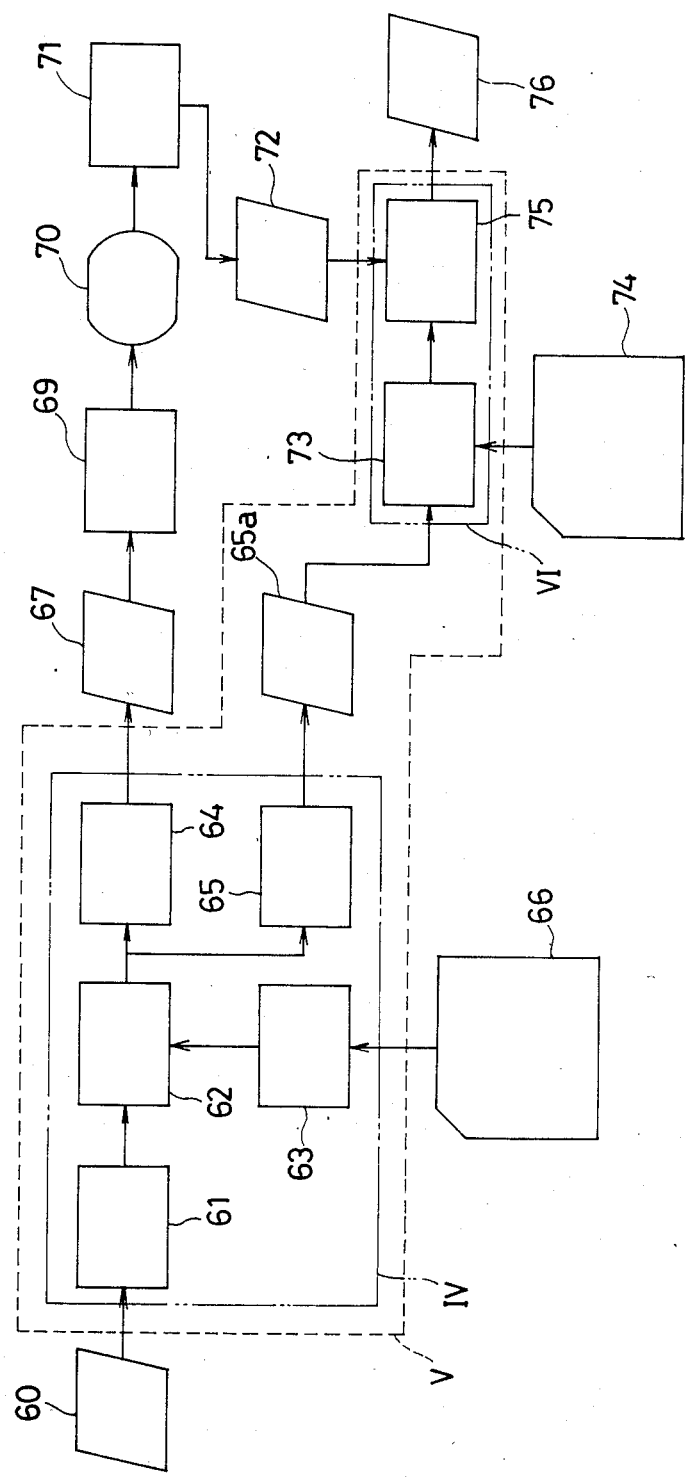
FIG. 10 is a block diagram illustrating a control system in a control apparatus in accordance with still another embodiment of the present invention, said control system being provided with another vulcanizing operation monitoring device.

In the embodiment of the invention as illustrated in FIG. 9 the temperature and pressure of the vulcanizing medium preset in response to function signals are selected for practicing the invention. Alternatively, the temperature and pressure of the vulcanizing medium preset corresponding to a predetermined vulcanizing step may be selected as illustrated in FIG. 10. In this case, as is apparent from FIG. 10, a step signal output mechanism 65 is provided in addition to the function output mechanism 64 for outputting step signal 65a for each of the steps.

It should be noted that it is practically preferable to allow the microcomputer 62 to have an output function for the presetting device, the comparator and the alarm.

As described above, the step time for the introduction of vulcanizing medium into a tire and the discharging of the same therefrom and the selection of vulcanizing medium at each of the steps (function) are preset on the vulcanizing sequence timer and predetermined temperature and pressure of the vulcanizing medium in a tire are preset at each of the steps. Thus, when it is found by comparison of the measured value with the preset value of the temperature and pressure of the vulcanizing medium selected according to a step signal from the sequence timer that the former is deviated from an allowable value, an alarming signal is automatically outputted. Since this makes it possible to automatically monitor the working state of the vulcanizing medium during the automatic vaulcanizing operation, it is assured that failure of the tire product is reliably prevented and any delivery of the same into a commercial market is prevented.

It should be noted that where the microcomputer 62 is added with the functions of presettig, comparing and alarm issuing is identified with an area V as shown by dotted lines in FIG. 10 but the invention should not be limited only to this and it may be embodied by extracting a step signal from the timer function of the area IV as shown by two dot-chain lines and feeding it to a presetting device and a comparator in the area VI as shown by two dot-chain lines.

With respect to the presetting of the temperature and pressure of vulcanizing medium no presetting is required over the whole steps but presetting may be practically limited only to main steps (when hot water or steam is introduced) which have a significant effect on the tire vulcanizing state.

Figure 11:
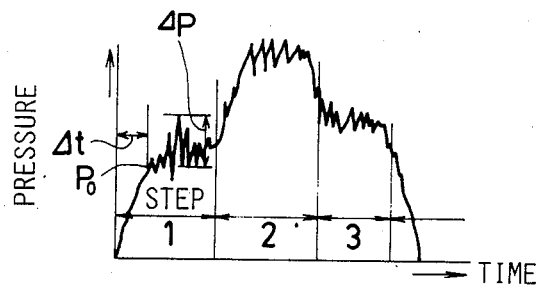
FIG. 11 is a time-pressure diagram for the control apparatus in FIG. 10, particularly illustrating how pressure monitoring is effected.

Further, where pressure is monitored various considerations are taken in the form of filter cutting or the like for the purpose of practicing the invention, because an arrangement for inhibiting the issuance of alarm signal with the aid of a timer or the like means for a period of time $\Delta t$ until a predetermined pressure $P_o$ is reached, an occurance of momentary peak pressure deviated from the aforesaid pressure $P_o$ by a pressure of $\Delta p$ as illustrated in FIG. 11 or the like matter are practically without problems and therefore said considerations are merely a kind of matter which can be readily dealt with by any expert in the art. Accordingly, their detailed description will not be required.

In the embodiments as illustrated in FIGS. 9 and 10 where the working state of the vulcanizing medium is automatically monitored at all times during the automatic vulcanizing operation it is assured that any production of a failed tire product is completely prevented and moreover any delivery of failed products to a commercial market is prevented as described above. It should be noted that the embodiments require that a detector, a presetting device and others are provided in order to monitor the supply of vulcanizing medium through a plurality of control valves 69 at all times.

When an embodiment as illustrated in FIG. 12 is employed, a vulcanization control apparatus can be provided which has simplified an inexpensive function monitoring capability.

In FIG. 12 reference numeral II designates a microcomputer type vulcanizing sequence timer which includes a time generator 61, a card reader 63 for reading the content of a magnetic card 66 on which step time in the vulcanizing step and function data are preset, a microcomputer 62 adapted to store the aforesaid data and issue function output command at each of the steps in accordance with time signal delivered from said time generator 61 on the basis of vulcanizing operation start signal 60 from the tire vulcanizing machine and a function output mechanism 64 including a plurality of electromagnetically operated valves adapted to output function signals 67 in the form of pilot pressure in accordance with said function output command in substantially the same manner as in the foregoing embodiment. As the function signals 67 are received, a plurality of ON-OFF type vulcanization inner pressure control valves 69 are opened and closed whereby vulcanizing medium is selectively introduced into a tire and discharged therefrom.

Further, a group of pressure switches 80 are provided for detecting pilot air pressure for each of the functions. Signals from said pressure switches 80 are delivered to a comparision mechanism 81, while function signals selected at each of the steps are delivered thereto from the function output mechanism 64. Thus, the selected function signals from the function output mechanism 64 and ON signals from the pressure switches for detecting function pilot pressure (i.e., this represents that predetermined pilot pressure is fed thereto) are compared with one another in the comparison mechanism 81. When both the signals are identical to one another, this means that automatic operation proceeds normally. On the other hand, when they are not identical, an alarming signal 82 is issued whereby an alarm such as a buzzer or the like is actuated or automatic operation is caused to stop. Due to the fact that there occurs a time lag between pressure raising until pilot air pressure to be delivered to the group of control valves 69 is raised up to a predetermined pressure and outputting of function signal it is preferable to make comparison therebetween by means of a timer in the comparison mechanism 81 or alarming mechanism 82 after a certain period of time has elapsed. Further, the microcomputer type vulcanizing sequence timer may have comparative function incorporated therein.

Since the control apparatus is constructed such that pilot air pressure serving as a function signal to be delivered to the group of control valves 69 from the vulcanizing sequence timer is detected by means of the pressure switch 80, the operating state that the pilot pressure switch corresponding to function specified by the vulcanizing sequence timer is turned on is confirmed and when it is found that it is not turned on as specified, an alarm signal is issued, there is no necessity for providing additional devices or instruments such as presetting device or the like and therefore a control apparatus having a inexpensive and simple function monitoring mechanism can be provided, resulting in prevention of production of rejected products. It should be noted that the pressure switch and the comparison mechanism may be designed and constructed in a variety of types other than those described above each of which should be considered within the scope of the invention.

While the invention has been described above with respect to several preferred embodiments, it should be of course understood that the invention should not be limited only to them but various changes or modifications may be made in a suitable manner without any departure from the spirit and scope of the invention.

What is claimed is:

1. A control apparatus for a vulcanizing machine in which vulcanizing is effected by introducing a vulcanizing medium into a rubber-made product loaded on a molding die and then discharging the same therefrom tio vulcanize said rubber-made product, said control apparatus comprising:

a vulcanizing sequence timer for controlling sequential functional operations of said vulcanizing machine;
a vulcanizing sequence timer memory having,
  a data keyboard for inputting vulcanizing data,
  a control keyboard for discriminating and identifying vulcanizing data inputted within said data keyboard, and
  a display section for displaying preset vulcanizing data;
means for outputting a function signal in response to a vulcanizing operation start signal from said vulcanizing sequence timer on the basis of said vulcanizing data introduced with said data keyboard, said vulcanizing data including preset vulcanizing steps and functions;
a plurality of control valves, responsive to said vulcanizing sequence timer, for controlling the introduction and discharge of said vulcanizing medium in accordance with said vulcanizing sequence timer;
a magnetic card reader writer for reading and storing preset vulcanizing data from a magnetic card, said card reader writer being connectable to said vulcanizing sequence timer;
means for detecting the temperature and pressure of said vulcanizing medium being introduced and discharged;
a detector for detecting the temperature of said molding die; and
control means, responsive to the temperature of said molding die and the temperature and pressure of said vulcanizing medium for issuing a vulcanizing time prolonging command when the molding die temperature detected at the beginning of the vulcanizing operation is less than a preset value;
said vulcanizing time prolonging command operating in association with said preset vulcanizing data read from said magnetic card for instructing said sequential functional operations of said vulcanizing machine.

2. The apparatus as defined in claim 1, wherein the detector is located in the proximity of the parting line between both the upper and lower die halves.

3. The control apparatus as defined in claim 1, wherein said vulcanizing time prolonging command is preset by said keyboard or said magnetic card, wherein both the length of time and sequential function step to be prolonged are preset.

4. A control apparatus for a vulcanizing machine as defined in claim 1, wherein said control means is a molding die temperature control device for controlling molding die heating temperature and including means for presetting molding die heating temperature in response to the vulcanizing data to thereby control said molding die temperature control device in response to the output signal from the vulcanizing sequence timer.

5. A control apparatus for a vulcanizing machine in which vulcanizing is effected by introducing a vulcanizing medium into a rubber-made product loaded on a molding die and then discharging the same therefrom to vulcanize said rubber-made product, said control apparatus comprising:
a vulcanizing sequence timer for controlling sequential functional operations of said vulcanizing machine;
a vulcanizing sequence timer memory having,
  a data key board for inputting vulcanizing data, said vulcanizing data including preset vulcanizing steps and functions,
  a control key board for discriminating and identifying vulcanizing data inputted within said data key board, and
  a display section for displaying preset vulcanizing data;
means for outputting function signals from said vulcanizing sequence timer in response to a vulcanizing operation start signal;
a plurality of control valves, responsive to said vulcanizing sequence timer, for controlling the introduction and discharge of said vulcanizing medium in accordance with said timer;
a magnetic card reader writer for reading and storing preset vulcanizing data from a magnetic card, said card reader writer being connectable to said vulcanizing sequence timer; and
an automatic operation monitoring device including
  a presetting device for selecting a preset temperature and pressure of said vulcanizing medium in response to a function signal ouptut by said vulcanizing sequence timer,
  a detector for detecting the temperature and pressure of the vulcanizing medium introduced and discharged from said plurality of valves in response to function signals output by said vulcanizing sequence timer, and
  comparator means for issuing an alarm signal when a detected temperature and pressure is greater than said preset temperature and pressure;
said automatic operation monitoring device including a buzzer adapted to issue said alarm information in accordance with generation of the alarm signal by said comparator.

6. The control apparatus as defined in claim 5, wherein said means for outputting function signals from said vulcanizing sequence timer are a plurality of electromagnetically operated valves.

7. The control apparatus as defined in claim 5, wherein said vulcanizing sequence timer stores preset sequential functional operations of said vulcanizing machine including the steps at which the introducing and discharging of the vulcanizing medium occur, and said comparator means further compares whether said preset temperature and pressure correspond to the correct sequential functional operations.

8. The control apparatus as defined in claim 5, wherein said temperature and pressure are preset for each sequential operational function step of introducing and discharging said vulcanizing medium.

9. A control apparatus as defined in claim 5, further including
a plurality of pressure switches for detecting pilot air pressure during the introducing and discharging of said vulcanizing medium,
means for comparing the detected pilot air pressure with said preset vulcanizing data of said vulcanizing sequence timer, and
means for outputting an alarm signal when said means for comparing indicates that said vulcanizing medium is not being introduced or discharged in accordance with the preset vulcanizing data of said vulcanizing sequence timer.

* * * * *